United States Patent [19]
Reiter et al.

[11] Patent Number: 5,166,891
[45] Date of Patent: Nov. 24, 1992

[54] PROCESS FOR DETERMINING SIZE ACCURACY OF BORES FORMED BY LASER PULSES

[75] Inventors: Rolf Reiter, Munich; Erwin Bayer, Dachau; Ludwig Steinhauser, Maisach, all of Fed. Rep. of Germany

[73] Assignee: MTU Motoren-Und Turbinen-Union Munchen GmbH, Munich, Fed. Rep. of Germany

[21] Appl. No.: 424,550

[22] Filed: Oct. 20, 1989

[30] Foreign Application Priority Data

Oct. 21, 1988 [DE] Fed. Rep. of Germany ....... 3835981

[51] Int. Cl.$^5$ .................. G06K 9/48; G01B 11/08
[52] U.S. Cl. .................. 364/560; 364/474.08; 382/8; 382/51; 33/555.1
[58] Field of Search .............. 364/560, 564, 474.08; 382/8, 51; 33/555.1, 542

[56] References Cited

U.S. PATENT DOCUMENTS

| | | | |
|---|---|---|---|
| 3,822,946 | 7/1974 | Rynkowski | 350/160 |
| 4,336,591 | 6/1982 | Okubo et al. | 364/560 |
| 4,555,798 | 11/1985 | Broadbent, Jr. et al. | 382/8 |
| 4,689,467 | 8/1987 | Inoue | 219/121.76 |
| 4,695,884 | 9/1987 | Anastassiou et al. | 358/163 |
| 4,737,618 | 4/1988 | Frye | 219/121 LN |
| 4,753,555 | 6/1988 | Thompson et al. | 33/542 |
| 4,790,023 | 12/1988 | Matsui et al. | 382/8 |
| 4,796,363 | 1/1989 | Rutter et al. | 33/542 |
| 4,823,394 | 4/1989 | Berkin et al. | 382/8 |
| 4,918,611 | 4/1990 | Shyu et al. | 364/474.08 |

FOREIGN PATENT DOCUMENTS

2115142 9/1982 United Kingdom .

*Primary Examiner*—Vincent N. Trans
*Attorney, Agent, or Firm*—Ladas & Parry

[57] ABSTRACT

A process for testing the tolerances of bores made by laser pulses records a matrix image of the bore region during each laser pulse and evaluates the matrix image to determine the average bore diameter. Compliance with the required tolerances can thereby be achieved during the boring operation. The evaluation of the matrix image is made by optically forming a half tone, dot matrix, mosaic image of the bore and its surrounding region, adding gray scale values of the dots in the columns and rows and differentiating the column and row totals to produce spaced maxima for the rows and columns. The distance between the spaced maxima in the rows and columns represents the diameter of the bore in the direction of the rows and columns respectively.

5 Claims, 2 Drawing Sheets

PROCESS FOR DETERMINING SIZE ACCURACY OF BORES FORMED BY LASER PULSES

FIELD OF THE INVENTION

The invention relates to processes and apparatus for determining size accuracy of bores formed by laser pulses and particularly to determine if such bores are within predetermined tolerances for the nominal bore diameter.

BACKGROUND AND PRIOR ART

Laser pulse drilling processes are used to form bores of small diameter, for example, in hollow workpieces. Turbine blades in particular have a number of such fine bores for passage of cooling air which can be made automatically by this process with high positional accuracy.

However, the bores must also comply with precise tolerance with regard to their diameter to produce the cooling air flow rate necessary in operation. For example, if the individual diameters of the bores are too small, this can lead to unacceptable overheating of the turbine blades and to their failure. In turn, this can lead to the failure of the entire gas turbine system. It is therefore important to check the dimensional compliance of the bores produced. This has been done heretofore by inserting measuring rods manually into the individual bores. This process involves an extraordinarily high expense which is associated with excessively high costs.

SUMMARY OF THE INVENTION

Starting from this point, it is an object of this invention to provide a process by which the diameter of bores can be evaluated rapidly and automatically.

In accordance with the invention, a process is provided comprising optically viewing along an axis, on which successive laser pulses are applied to the workpiece, to produce a halftone image of a laser pulse on the workpiece and the surrounding region, said image being in the form of a halftone dot matrix and determining from said image the size of the bore produced by the laser pulses and the compliance of the size of the bore with tolerance values established therefor.

In one embodiment of the invention, the size of the bore is determined by comparing the brightness of each image dot with a reference value and producing a binary coded mosaic image of the bore, then determining the number of image dots associated with the bore as an indication of the cross sectional area A of the bore and thereafter determining the average bore diameter d from the cross sectional area A of the bore from the formula $d = 2\sqrt{A/\pi}$ The determined value of the bore diameter d can then be compared with the desired bore diameter to determine if the actual bore diameter d is within tolerance values for the desired bore diameter.

The process of the invention has the advantage that the size compliance of the bores can be evaluated substantially simultaneously with the production of the bores. Thus, immediately after producing a bore, it can be determined whether the tolerances have been met. If the bore diameters of individual bores are too small, the bore in question can be reworked immediately without reclamping and realigning the workpiece. This provides a substantial simplification of the testing process and of the remachining process.

In a beneficial refinement of the invention, a reference value is obtained by determining the frequency of the gray scale values of the matrix image such that it lies between a maximum with low gray scale value and a maximum with high gray scale value. The dots with low gray scale value are correlated with the background, while the dots with high gray scale value are correlated with the bright bore spot. When choosing the reference value between the two extremes, the matrix image can be binary coded in this way so that the edge of the bore can be accurately and exactly established. Thus, after carrying out the other process steps, the bore diameter can be determined with high accuracy.

Another beneficial refinement of the invention involves calculating moments of inertia of the bore cross section area. Around orthogonal axes and determining the sizes of the major and minor axes of an equivalent elliptical surface when the bores do not have a circular cross section. This may be the result of dirt in the laser beam path, or by non-uniformity in the intensity distribution of the infrared radiation. The elliptical shape can also be caused by inclination of the surface of the workpiece with respect to the laser beam, or by nonuniform resolidification of molten metal.

In apparatus for carrying out the process according to the invention, a semi-transparent mirror is used to deflect the path of the laser beam and the optical recording instrument is positioned so that the light reflected from the region of the bore passes through the semi-transparent mirror into the lens of the optical recording instrument. This permits simple attachment of the apparatus to implement the process, since the laser equipment normally employs mirrors to deflect the laser beam.

According to a further embodiment of the invention for determining the size of the bore optically, the gray scale values of dots in the columns are added to obtain gray scale value column totals and the gray scale values of the dots in the lines are added to obtain gray scale value line totals. These totals are differentiated to produce differentiated total value curves having spaced maxima. The horizontal diameter is determined from the distance between the maxima of the column total curve while the vertical diameter is determined from the distances between the maxima of the line total curve. The determined values of bore diameter are then compared with tolerance values to produce a signal to indicate if there is compliance with the tolerance values.

This process has the advantage that further improvement can be produced in the accuracy of determination of the diameter. The measurement error in this process is about 0.4% with a desired diameter of 30 image dots, and about 0.05% with a diameter of 150 image dots.

BRIEF DESCRIPTION OF THE FIGURES OF THE DRAWING

FIG. 2b is a histogram of gray scale values derived from the image in FIG. 2a.

DETAILED DESCRIPTION OF PREFERRED EMBODIMENTS

Figure 1:
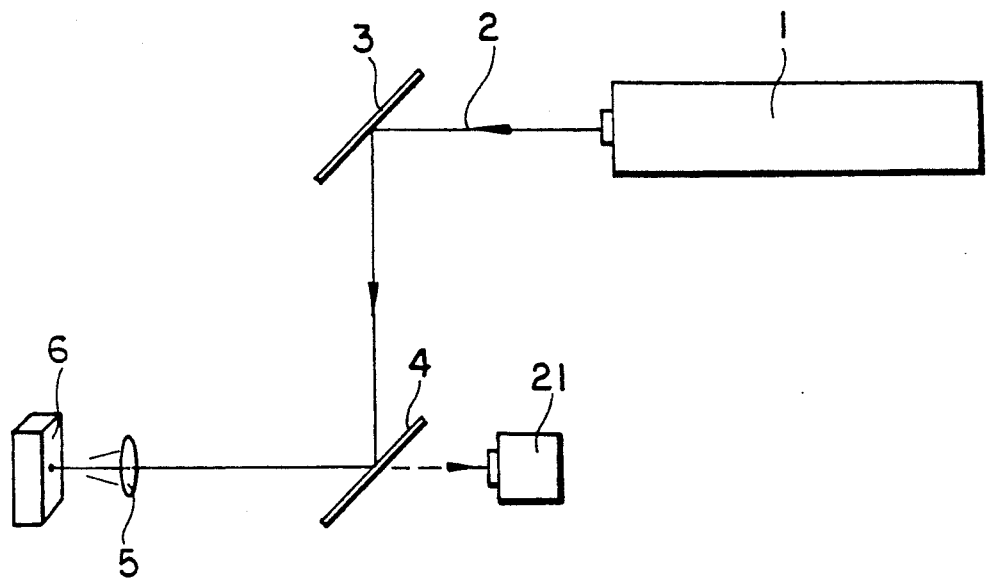
FIG. 1 is a schematic illustration of a laser boring system together with an optical measuring system according to the invention.

FIG. 1 shows a laser generator 1 which produces a laser beam 2 guided by two mirrors 3 and 4 to a collimating lens 5. After collimation, the laser beam strikes a workpiece 6. The baser beam is supplied in pulses to produce a bore in the workpiece. An infrared laser generator that emits laser pulses at a pulse rate of between 2 and 10 Hz is suitable as the laser generator 1. The mirror 4 is of semi-transparent construction so that the light reflected from the workpiece can pass through the mirror 4 and arrive at an optical recording instrument 21.

Figure 2A:
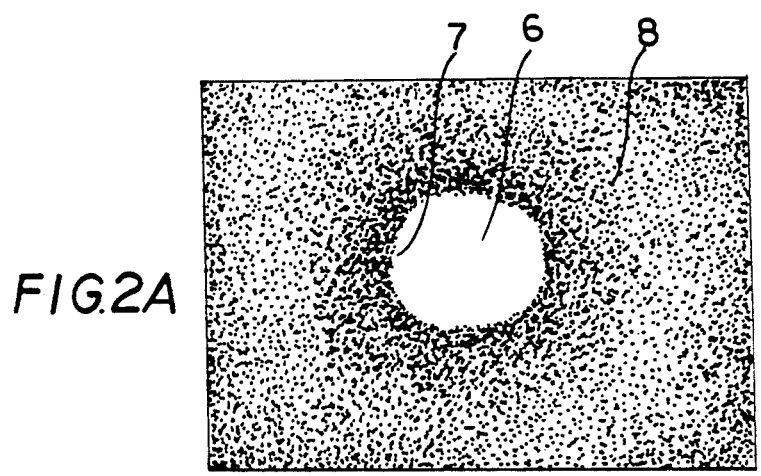
FIG. 2a is a halftone mosaic image of a bore produced by the optical measuring system.

FIG. 2a shows an image of a laser pulse produced in such a system. Therein is seen a bright spot of light 6 which represents an image of the bore. The edge of the bore 7, however, is indistinctly defined from the surrounding workpiece surface 8.

Figure 2B:
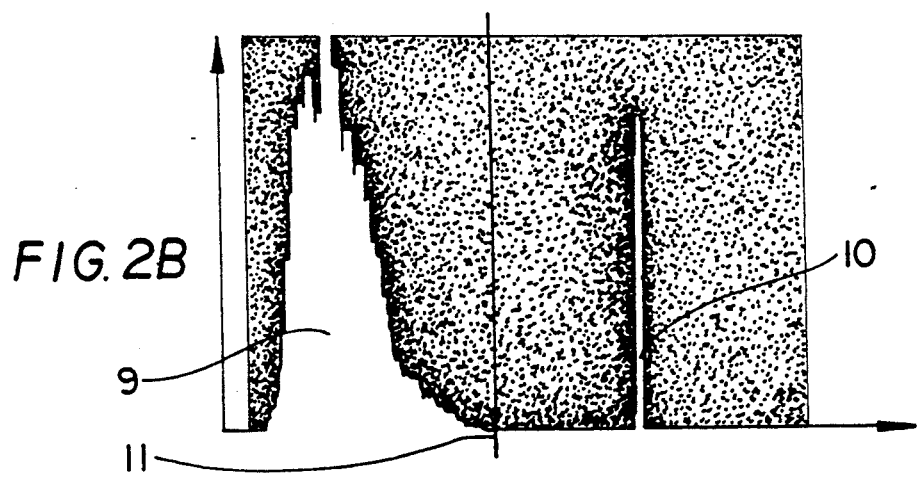
Figure 2C:
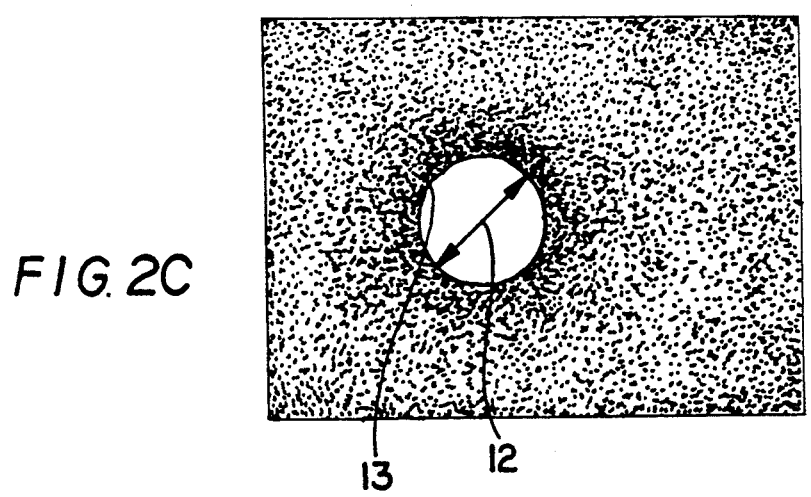
FIG. 2c is a binary coded image of the bore.

FIG. 2b shows a gray scale value histogram of the region in FIG. 2a. In FIG. 2b, brightness is plotted on the abscissa and the number of image dots that have such a brightness is plotted on the ordinate. A first region 9 identifies a large number of image dots with relatively low brightness. This region 9 corresponds to the material 8 surrounding the light spot 6 in FIG. 2a. A narrower region 10 formed by a number of image dots with substantially higher brightness corresponds to the area of the luminous spot 6. For the purpose of binary coding the illustration in FIG. 2a, a threshold value 11 is selected which has a brightness value between the brightness values of the region 9 and the region 10. Each individual image dot is then compared with threshold value 11, whereby a binary coded image of the bore is produced according to FIG. 2c. In FIG. 2c it can be seen that the binary coded luminous spot 12 has a clearly defined bore edge 13. If the resolution of the image is adequate, an exact depiction of the bore is formed in this way. The threshold value 11 is chosen precisely by carrying out a bimodality analysis of the gray scale value histogram for two selected portions of the image, namely the background and the bore. The threshold is established so that all image dots that do not belong to the bore (this also includes any brighter image dots of the bore itself) are counted as part of the background. The number of dots belonging to the bore is representative of the area A of the bore and the diameter of the bore can be evaluated from the formula $d = 2\sqrt{A/\pi}$.

Figure 3:
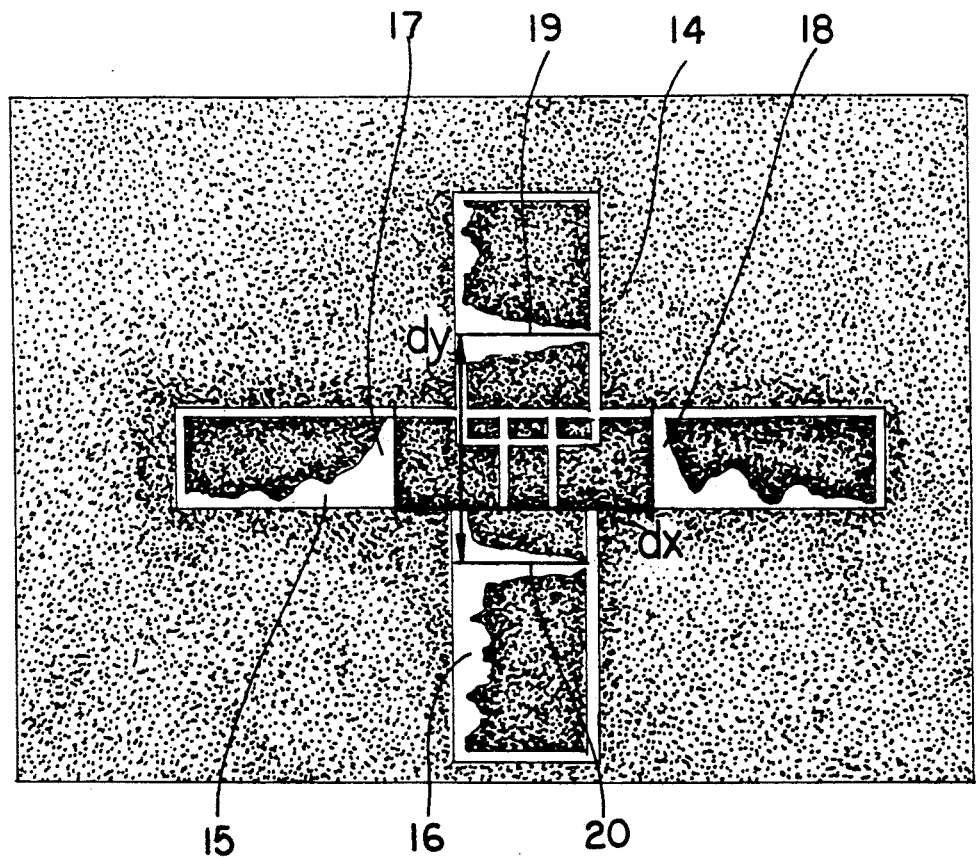
FIG. 3 is an image of a bore with curves of gray scale total values in columns and rows superimposed thereon.

FIG. 3 represents an alternative process for determining the bore diameter, in which a column total curve 15 and a line total curve 16 are placed over the matrix image 14. The column total curve 15 is obtained by differentiating the total of gray scale values of the dots in the columns, and the line total curve 16 is obtained by differentiating the total of gray scale values of the dots in the lines. The differentiated column and line curves each has two spaced maxima. The maxima of the column total curve 15 are shown at 17 and 18 and their spacing corresponds to the bore diameter dx in this direction. Similarly, the maxima of the line total curve are shown at 19 and 20 from which diameter dy can be determined. The two diameters dx and dy may differ from one another to the extent that the bore has an elliptical shape.

While the invention has been described in relation to specific embodiments thereof, it will become apparent to those skilled in the art that numerous modifications and variations can be made within the scope and spirit of the invention as defined in the attached claims.

What is claimed is:

1. A process for testing the size accuracy of bores formed in a workpiece by laser pulses, said process comprising:
    a) optically forming a halftone mosaic image of a bore and its surrounding region in the form of an image dot matrix during a laser pulse, the image dot matrix being formed in rows and columns,
    b) adding gray scale values of dots in the columns to obtain gray scale value column totals, and adding the gray scale values of the dots in the lines to obtain gray scale value line totals,
    c) differentiating the column and line totals to form respective column and line curves each having spaced maxima values,
    d) determining the horizontal diameter dx and the vertical diameter dy from the distances between the maxima of the respective curves,
    e) the values of diameters dx and dy being representative of the horizontal and vertical diameters of the bore, and
    f) comparing said values of dx and dy with a desired bore diameter to determine if the actual bore diameters dx and dy are within predetermined tolerance values.

2. A process as claimed in claim 1 comprising producing an output signal when the determined values of bore diameter dx and dy are within the tolerance values.

3. A process as claimed in claim 1 wherein the laser pulses are produced in a beam which is reflected onto the workpiece by a semi-transparent mirror and said halftone mosaic image of the bore is optically formed by viewing the workpiece along the path of the laser beam through said semi-transparent mirror.

4. A process as claimed in claim 1 wherein the bores are formed in the workpiece by successive laser pulses along an axis, said process further comprising optically viewing along said axis to produce said half tone mosaic image of the bore produced by the laser pulses.

5. A process as claimed in claim 4 comprising producing said half tone mosaic image between successive laser pulses.

* * * * *